(12) United States Patent
Anantha et al.

(10) Patent No.: US 8,793,031 B2
(45) Date of Patent: Jul. 29, 2014

(54) DATA SELECTION AND SHARING BETWEEN A VEHICLE AND A USER DEVICE

(75) Inventors: Anoop Anantha, Kirkland, WA (US); Jyh-Han Lin, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/294,161

(22) Filed: Nov. 10, 2011

(65) Prior Publication Data

US 2013/0124006 A1    May 16, 2013

(51) Int. Cl.
    G05B 19/02    (2006.01)
(52) U.S. Cl.
    USPC .............................................. 701/1; 340/4.3
(58) Field of Classification Search
    USPC .............................................. 701/1; 340/4.3
    See application file for complete search history.

(56) References Cited

U.S. PATENT DOCUMENTS

| | | | |
|---|---|---|---|
| 7,856,360 B2 * | 12/2010 | Kramer et al. ................. | 705/1.1 |
| 7,904,219 B1 * | 3/2011 | Lowrey et al. ................ | 701/32.3 |
| 8,180,379 B2 * | 5/2012 | Forstall et al. .............. | 455/456.6 |
| 2005/0193054 A1 * | 9/2005 | Wilson et al. ................ | 709/200 |
| 2006/0103590 A1 | 5/2006 | Divon | |
| 2007/0238491 A1 * | 10/2007 | He .............................. | 455/569.2 |
| 2009/0005070 A1 * | 1/2009 | Forstall et al. .............. | 455/456.1 |
| 2009/0318168 A1 | 12/2009 | Khosravy et al. | |
| 2010/0097239 A1 * | 4/2010 | Campbell et al. ........ | 340/825.25 |
| 2010/0313142 A1 * | 12/2010 | Brown .......................... | 715/747 |
| 2011/0195659 A1 * | 8/2011 | Boll et al. .................... | 455/11.1 |
| 2012/0225677 A1 * | 9/2012 | Forstall et al. ............. | 455/456.6 |

OTHER PUBLICATIONS gpssystems.net, Apr. 28, 2012 A-GPS.*
Nomadic Device Integration in AIDE, Mike Gardner, Motorola, Apr. 15-16, 2008, Gothenburg.*
Griffin, Darren, "VNC Announces Automotive Solution for Smartphones", Retrieved at <<http://www.pocketgpsworld.com/VNC-Announces-Automotive-Solution-For-Smartphones-2945.php>>, Feb. 27, 2011, pp. 2.
"Aiming for the Perfect Integrated Mobile Phone-Vehicle Navigation Solution", Retrieved at <<http://news.thewherebusiness.com/content/aiming-perfect-integrated-mobile-phone-vehicle-navigation-solution>>, Jan. 6, 2011, pp. 2.

(Continued)

*Primary Examiner* — Mary Cheung
*Assistant Examiner* — Michael Berns
(74) *Attorney, Agent, or Firm* — Bryan Webster; Andrew Sanders; Micky Minhas

(57) ABSTRACT

Embodiments enhance the functionality of a vehicle, a user device, or both by the selection and sharing of data. Upon detection of each other, the vehicle device and the user device obtain and share data. The data may be associated with the user, the user computing device, and/or the vehicle and may be stored in cloud-based services. Functionality of the vehicle and/or user device is customized to the user based on the shared data. For example, the user device may provide assisted global positioning system (GPS) data to the vehicle to reduce a time-to-fix (TTF) when determining a location of the vehicle. In other examples, settings of the vehicle are personalized to the user, and location-relevant content is downloaded to the user device.

20 Claims, 4 Drawing Sheets

(56) References Cited

OTHER PUBLICATIONS

"Parrot CK3100 Advanced Bluetooth Car Kit (US)", Retrieved at <<http://www.parrotshopping.com/us/p_parrot_item.aspx?i=148672>>, Jul. 11, 2011, pp. 5.

Zahradnik, Fred, "How to Use In-car GPS for Hands-free Mobile Phone Calling", Retrieved at <<http://gps.about.com/od/gpsproductoverview/ht/Hands_Free_How.htm>>, Retrieved Date: Aug. 17, 2011, p. 1.

"Unlock the Big Screen Experience from Small Devices", Retrieved at <<http://www.microvision.com/pico_projector_displays/standalone.html>>, Retrieved Date: Aug. 16, 2011, p. 1.

Garrett, Jerry, "Hyundai BlueLink Arrives in a Suddenly Crowded Telematics Field," The New York Times, Jan. 7, 2011, p. 1.

Squatriglia, Chuck, "Toyota, Microsoft to Bring the Cloud to Cars", <<http://web.archive.org/web/20110410132925/http:/www.wired.com/autopia/2011/04/toyota-microsoft-to-bring-the-cloud-to-cars/>>, Apr. 6, 2011, pp. 3.

* cited by examiner

DATA SELECTION AND SHARING BETWEEN A VEHICLE AND A USER DEVICE

BACKGROUND

Existing vehicles such as automobiles provide navigation, entertainment, and communication functionality to a vehicle occupant. Some of these existing vehicles also allow limited sharing of information between the vehicle and the mobile telephone of an occupant. For example, the occupant may be able to pair the mobile telephone to enable hands-free calling and to connect a portable media player to play music within the vehicle.

SUMMARY

Embodiments of the disclosure enable the selection and sharing of data between a user computing device of a user and a vehicle computing device in a vehicle. At least one of the devices detects the other. Content associated with the user and/or the user computing device is obtained. Sensor data from sensors associated with the vehicle is obtained. Based on the obtained content and the obtained sensor data, data is selected and displayed to the user by the user computing device and/or the vehicle computing device to enhance the user experience.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure provide a personalized vehicle and device experience for a user 108. Data is selected and shared between a vehicle 104 and at least one user computing device 102 of the user 108 inside or near the vehicle 104. The shared data enables customization, personalization, or other enhancements to be made to the vehicle 104, the user computing device 102, or both. For example, assisted global positioning system (GPS) data may be provided by the user computing device 102 to the vehicle 104 to decrease the time-to-fix (TTF) for a location determination system in the vehicle 104. In another example, location-relevant content for the user 108 is selected and shared.

Figure 1:
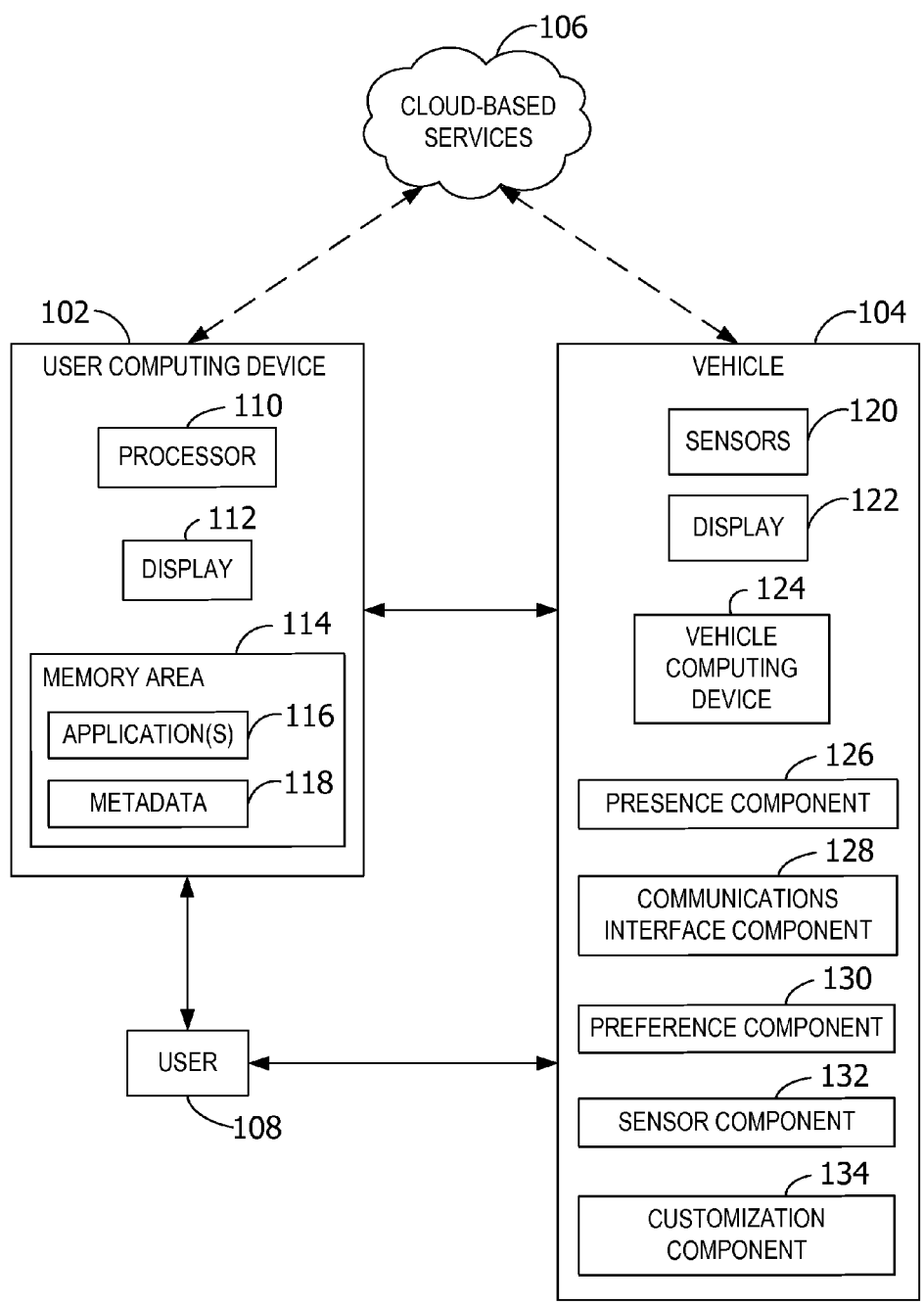
FIG. 1 is an exemplary block diagram illustrating a user computing device communicating with a vehicle.

Referring next to FIG. 1, an exemplary block diagram illustrates the user computing device 102 communicating with the vehicle 104. In the example of FIG. 1, the user computing device 102 is proximate, or otherwise near, to the vehicle 104 to enable communication between the user computing device 102 and the vehicle 104. For example, the user computing device 102 may be within the vehicle 104. While aspects of the disclosure may be described with reference to the vehicle 104 being a vehicle for personal transport such as an automobile, aspects of the disclosure are operable with any vehicle. For example, the disclosure is operable with airplanes, subway cars, train cars, and the like.

The user computing device 102 and/or the vehicle 104 have access to cloud-based services 106. Aspects of the disclosure are operable with embodiments in which one or both of the user computing device 102 and the vehicle 104 have access to the cloud-based services 106. For example, the vehicle 104 may be natively connected to the cloud-based services 106, or may connect to the cloud-based services 106 via the user computing device 102. The user computing device 102 may act as a transport for higher-layer message exchange between the vehicle 104 and the cloud-based services 106. The user computing device 102 and/or vehicle 104 may communicate with each other and the cloud-based services 106 using any data or communication transfer protocol. For example, the user computing device 102, the vehicle 104, and the cloud-based services 106 may exchange information via BLUETOOTH brand communication, Wi-Fi, and/or cellular communication protocols. The user computing device 102, the vehicle 104, and the cloud-based services 106 may also exchange information via any wired communication protocol, such as in a scenario where the user computing device 102 is tethered to the vehicle 104 with a cable. The user computing device 102 and/or the vehicle 104 may have a persistent connection to the cloud-based services 106. In other embodiments, the user computing device 102 and/or the vehicle 104 buffer data to anticipate intermittent loss of connectivity with the cloud-based services 106 (e.g., when moving through an area with poor network coverage) or to save on network bandwidth costs.

The user computing device 102 is associated with the user 108. The user computing device 102 represents any device executing instructions (e.g., as application programs, operating system functionality, or both) to implement the operations and functionality associated with the user computing device 102. The user computing device 102 may include a mobile computing device or any other portable device. In some embodiments, the mobile computing device includes a mobile telephone, laptop, tablet, computing pad, netbook, gaming device, and/or portable media player. The computing device may also include less portable devices such as desktop personal computers, kiosks, and tabletop devices. Additionally, the computing device may represent a group of processing units or other computing devices.

The user computing device 102 has at least one processor 110, a memory area 114, and, in some embodiments, at least one display 112. The processor 110 includes any quantity of processing units, and is programmed to execute computer-executable instructions for implementing aspects of the disclosure. The instructions may be performed by the processor 110 or by multiple processors executing within the user computing device 102, or performed by a processor external to the user computing device 102. In some embodiments, the processor 110 is programmed to execute instructions such as those illustrated in the figures (e.g., FIG. 4).

The user computing device 102 further has one or more data stores such as the memory area 114. The memory area 114 includes any quantity of media associated with or accessible by the user computing device 102. The memory area 114 may be internal to the user computing device 102 (as shown in FIG. 1), external to the user computing device 102 (not shown), or both (not shown).

The memory area 114 stores, among other data, one or more applications 116. The applications 116, when executed by the processor 110, operate to perform functionality on the user computing device 102. Exemplary applications 116 include mail application programs, web browsers, calendar application programs, address book application programs, messaging programs, media applications, location-based services, search programs, and the like. The applications 116 may communicate with counterpart applications or services such as web services accessible via a network. For example, the applications 116 may represent downloaded client-side applications that correspond to server-side services executing in a cloud.

The memory area 114 further stores metadata 118 describing the user 108 and/or the user computing device 102. For example, the metadata 118 includes a user profile including preferences, activity history such as shopping information, mobility pattern (e.g., locations visited), information from social networking websites, calendar information, photos, and the like.

In some embodiments, the user computing device 102 further includes the display 112. The display 112 includes any means for displaying and/or receiving data from the user 108. For example, the display 112 may include a touch screen display. In other embodiments, the user computing device 102 has no display.

The user computing device 102 may also include one or more of the following to provide data to the user 108 or receive data from the user 108: speakers, a sound card, a camera, a microphone, a vibration motor, one or more accelerometers, a BLUETOOTH brand communication module, GPS hardware, and a photoreceptive light sensor.

The vehicle 104 has at least one vehicle computing device 124, one or more sensors 120, and at least one display 122. The vehicle computing device 124 represents any device capable of executing instructions (e.g., as application programs, operating system functionality, or both) to implement the operations and functionality associated with the vehicle computing device 124. The instructions may be performed by one or more processors executing within the vehicle computing device 124, or performed by a processor external to the vehicle computing device 124. In some embodiments, the instructions correspond to those illustrated in the figures (e.g., FIG. 3). The vehicle computing device 124 may be associated with, for example, an in-vehicle navigation or entertainment system.

The vehicle 104 also includes one or more of the sensors 120. The sensors 120 include any sensor capable of association with the vehicle 104 to provide data describing the vehicle 104, the environment near the vehicle 104, or both. For example, the sensors 120 may include a speedometer, wheel spin sensor, traction sensor, skid sensor, GPS receiver, hygrometer, accelerometer, fuel level meter, and the like.

The vehicle 104 further includes the display 122. The display 122 includes any means for displaying and/or receiving data from users 108 within the vehicle 104. For example, the display 122 may include a touch screen display such as included in an in-vehicle navigation or entertainment system.

The vehicle computing device 124 has access to one or more computer readable media storing computer-executable components or modules. Exemplary components include a presence component 126, a communications interface component 128, a preference component 130, a sensor component 132, and a customization component 134. Operation of the components, when executed, is described below with reference to FIG. 3.

Figure 2:
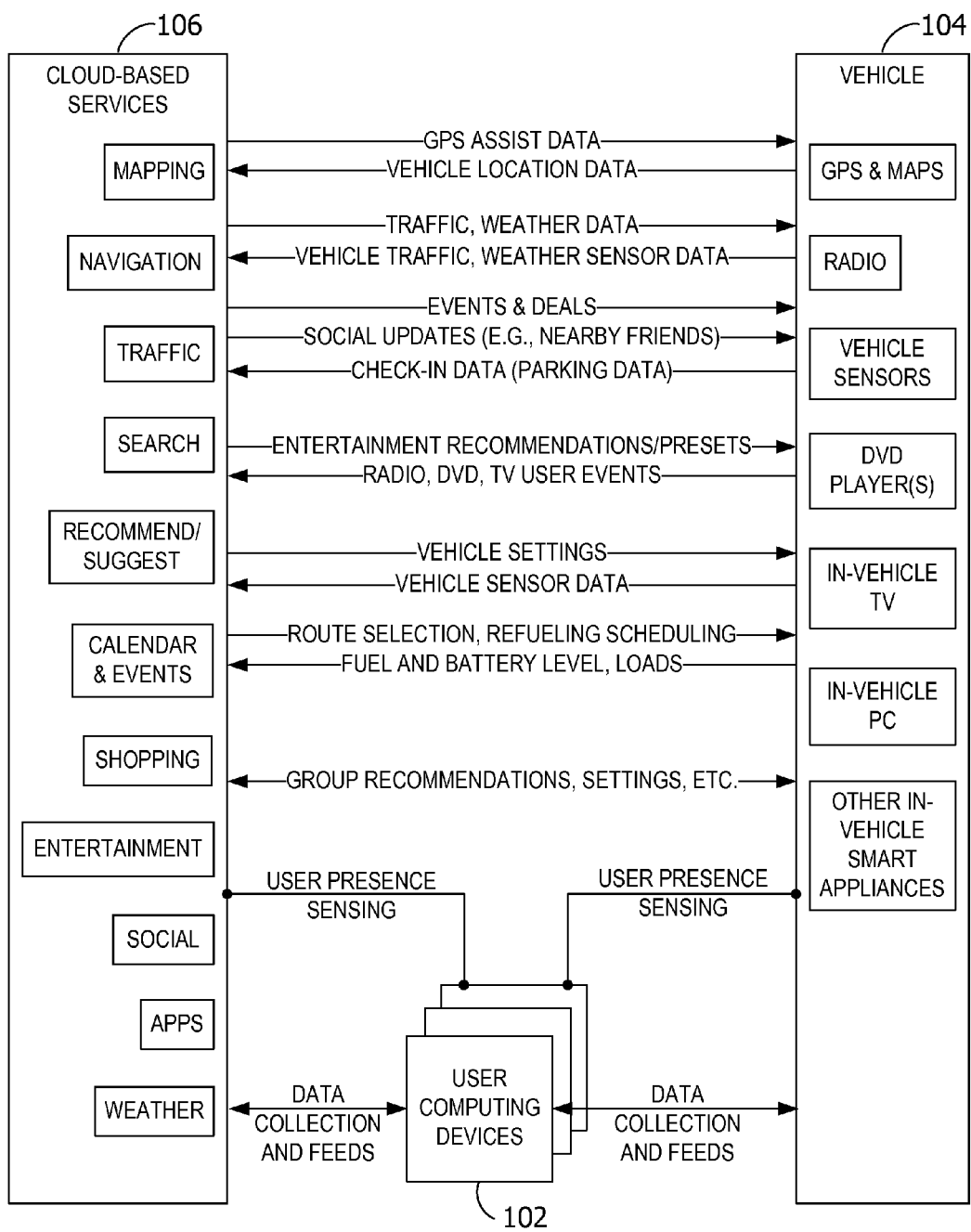
FIG. 2 is an exemplary block diagram illustrating the vehicle communicating with cloud-based services to enhance the user experience.

Referring next to FIG. 2, an exemplary block diagram illustrates the vehicle 104 communicating with cloud-based services 106 to enhance the user experience. The vehicle 104 may have one or more of the following elements: a global positioning system (GPS), maps, a radio (e.g., satellite, FM, AM), sensors 120, one or more DVD players, one or more in-vehicle displays 122, one or more in-vehicle computing devices 124, and other in-vehicle smart appliances. The cloud-based services 106 provide, for example, mapping, navigation, traffic, search, recommendations or suggestions, calendars, events, shopping, entertainment, access to social networks, applications, and weather.

Various scenarios describing some of the interaction between the vehicle 104 and the cloud-based services 106 are next described. Those skilled in the art will note that communication between the vehicle 104 and the cloud-based services 106 is not limited to the data or scenarios described herein, but is generally applicable to any communication that enhances the user experience. The cloud-based services 106 provide GPS assist data to the vehicle 104 while the vehicle 104 provides location data describing a current location of the vehicle 104. The cloud-based services 106 provide traffic and weather data while the vehicle 104 provides traffic conditions near the vehicle 104 and sensor data describing current weather near the vehicle 104. The vehicle 104 provides check-in information for one or more of the users 108 in the vehicle 104 when the vehicle 104 is at a particular location, and the cloud-based services 106 provide local events, deals, and social updates (e.g., friends) near the check-in location. The vehicle 104 provides user activity describing user interaction with the radio, DVD, and TV, while the cloud-based services 106 provide entertainment recommendations (e.g., movies, music, radio stations, news, and books). The cloud-based services 106 may also provide seat adjustments and channel presets.

The vehicle 104 provides sensor data to the cloud-based services 106, while the cloud-based services 106 provide vehicle settings to the vehicle 104 (e.g., affecting operation of the vehicle 104 based on the current sensor data). For example, the vehicle 104 may provide sensor data including a fuel level, battery level, passenger and/or payload weight, etc. In return, the cloud-based services 106 provide route selection, a refueling schedule, fuel economy settings, and the like. The vehicle 104 and the cloud-based services 106 may also exchange recommendations and settings tailored for a group of users 108 present in the vehicle 104 (e.g., merge or combine preferences of each of the users 108).

The vehicle 104 may be natively connected to the cloud-based services 106, or may go through one or more of the user computing devices 102 within proximity of the vehicle 104. In the latter example, the user computing devices 102 act as a proxy to collect data from the vehicle 104 and provide feeds from the cloud-based services 106 to the vehicle 104. The user computing devices 102 also provide presence information for the users 108 in the vehicle 104. For example, the user computing devices 102 may check-in the users 108 to social networking websites in the cloud-based services 106 and/or identify the users 108 to the vehicle 104 (e.g., by establishing a BLUETOOTH brand communication connection between the user computing devices 102 and the vehicle 104).

Figure 3:
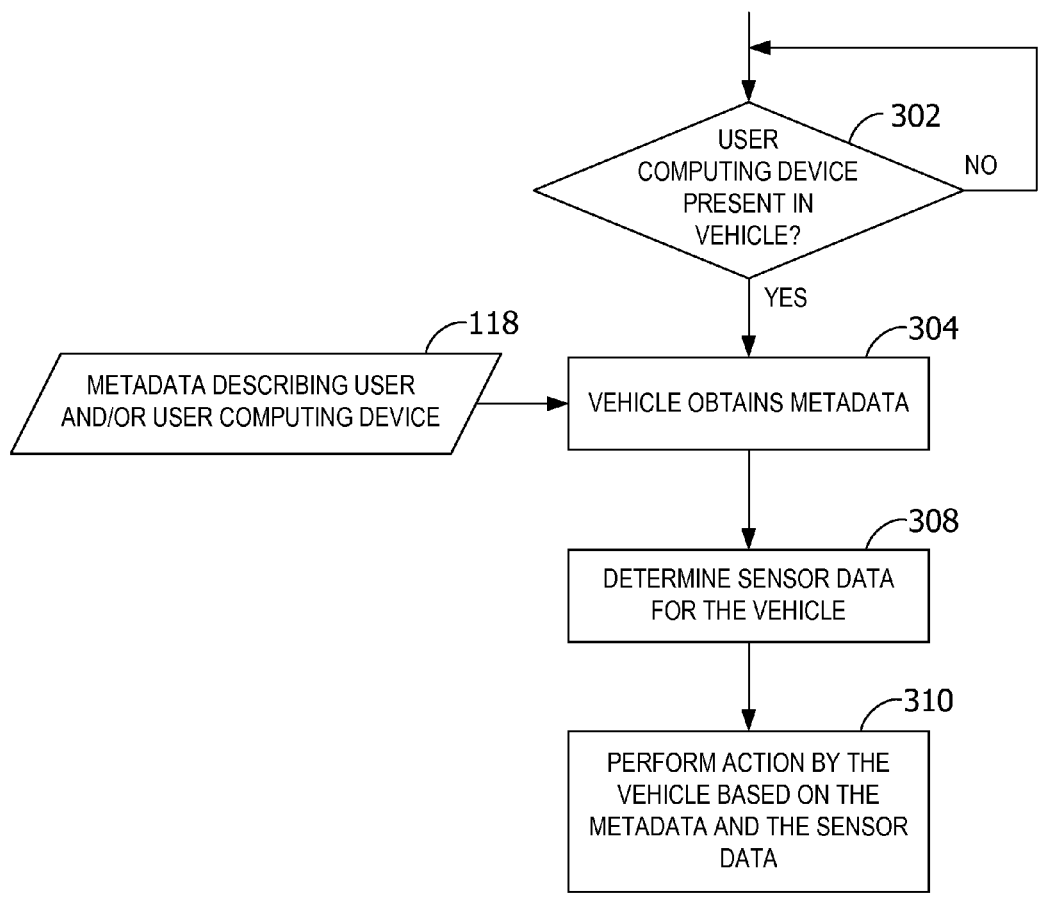
FIG. 3 is an exemplary flow chart illustrating operation of the vehicle to perform actions based on vehicle sensor data and metadata describing the user and/or user computing device.

Referring next to FIG. 3, an exemplary flow chart illustrates operation of the vehicle computing device 124 to perform actions based on vehicle sensor data and metadata 118 describing the user 108 and/or user computing device 102. The vehicle computing device 124 checks for the presence of the user 108 and/or the user computing device 102. For example, the vehicle computing device 124 checks a presence status of the user 108 on a social networking website, or detects the user computing device 102 via a request to establish a BLUETOOTH brand connection or other short wavelength radio transmission protocol between the vehicle computing device 124 and the user computing device 102.

If the vehicle computing device 124 detects the presence of at least one user computing device 102 in or near the vehicle 104 at 302, the vehicle computing device 124 obtains metadata 118 describing the detected user computing device 102 and/or the user 108 associated with the detected user computing device 102 at 304. For example, the vehicle computing device 124 obtains GPS data, or other sensor data, from the user computing device 102 (e.g., A-GPS data) for use by the vehicle computing device 124 in determining a location of the vehicle 104. Exemplary A-GPS data includes orbital data, precise time from the network, and approximate position. In another example, the vehicle computing device 124 obtains a profile of the user 108 including preferences, activity history, information from social networking websites, calendar information, and the like. The metadata 118 may be stored locally by the user computing device 102. Alternatively or in addition, one or more items of the metadata 118 may be stored by the cloud-based services 106, or elsewhere. For example, the metadata 118 may be stored in a cloud-based account of the user 108 (e.g., email account, social networking account, etc.).

At 308, the vehicle computing device 124 determines sensor data by, for example, obtaining current readings or values for one or more of the sensors 120 associated with the vehicle 104. Exemplary sensor data includes, but is not limited to, vehicle speed, vehicle acceleration, vehicle heading, ambient temperature, humidity, elevation, or any other data from the sensors 120 to determine a current status of the vehicle 104.

At 310, the vehicle computing device 124 performs at least one action based on the obtained metadata 118 and/or the sensor data. The vehicle computing device 124 performs, for example, one or more of the following: adjusting settings affecting operation of the vehicle 104 by the user 108, adjusting entertainment content available to the user 108 from the display 122 in the vehicle 104, and obtaining content tailored to the location and to the user 108 (e.g., local events and local advertisements).

In an exemplary scenario, the vehicle computing device 124 determines the sensor data by determining a location of the vehicle 104. The vehicle computing device 124 then performs a check-in of the user 108 to the determined location on one or more social networking websites. Alternatively or in addition, the vehicle computing device 124 then performs the action of obtaining data associated with points of interest to the user 108 near the location. For example, the points of interests are filtered by location, and based on the metadata 118 describing the user 108 to produce a set of points of interest that are specific to the user 108 at that location. In another scenario, the vehicle computing device 124 obtains a map of the determined location. The points of interest and the map may be presented to the user 108 on the display 122 of the vehicle 104 or may be sent to the user computing device 102 for display to the user 108.

In some embodiments, the computer-executable components illustrated in FIG. 1 execute to perform one or more of the operations illustrated in FIG. 3 but for a plurality of users 108 detected in the vehicle 104. In the following example scenario, preferences such as recommendations, events, deals, and the like are tailored for the group of users 108 as a whole, rather than for just one of the users 108.

The presence component 126, when executed by the processor of the vehicle computing device 124, causes the processor to detect a presence of a plurality of user computing devices 102 in the vehicle 104. The communications interface component 128, when executed by the processor of the vehicle computing device 124, causes the processor to obtain the metadata 118 describing users 108 of the user computing devices 102 responsive to the presence detected by the presence component 126. The metadata 118 may be stored by the user computing devices 102, cloud-based accounts of the users 108, or both. The communications interface component 128 may also provide information to the cloud-based service 106. For example, the communications interface component 128 captures user activity in the vehicle 104 for submission by the vehicle computing device 124 to content providers. The captured user activity is published to first- or third-party entities to improve the cloud-based experiences of the user 108 (e.g., preferences of the user 108 for music, movies, videos, news, and commerce). Examples of captured user activity include radio stations listened to, music played, news announced, CDs or DVDs played, stores visited, and the like. The capture and sharing of this activities or signals is used to improve personalized user experiences such as those provided by websites that are user data driven.

In some embodiments, the communications interface component 128 includes a network interface card and/or computer-executable instructions (e.g., a driver) for operating the network interface card.

The preference component 130, when executed by the processor of the vehicle computing device 124, causes the processor to combine the obtained metadata 118 for the users 108. For example, the preference component 130 combines the metadata 118 for the users 108 by combining preferences of the users 108 to produce content recommendations for display to the users 108 by the vehicle computing device 124.

The sensor component 132, when executed by the processor of the vehicle computing device 124, causes the processor to determine the sensor data describing a status of the vehicle 104. The customization component 134, when executed by the processor of the vehicle computing device 124, causes the processor to perform at least one action by the vehicle computing device 124 based on the combined metadata 118 of the users 108 and the determined sensor data of the vehicle 104.

In some embodiments, the presence component 126 further detects a seating location of each of the users 108 in the vehicle 104. The customization component 134 provides content to the detected seating location of each of the users 108 based on the individual or group recommendations from the combined metadata 118.

Figure 4:
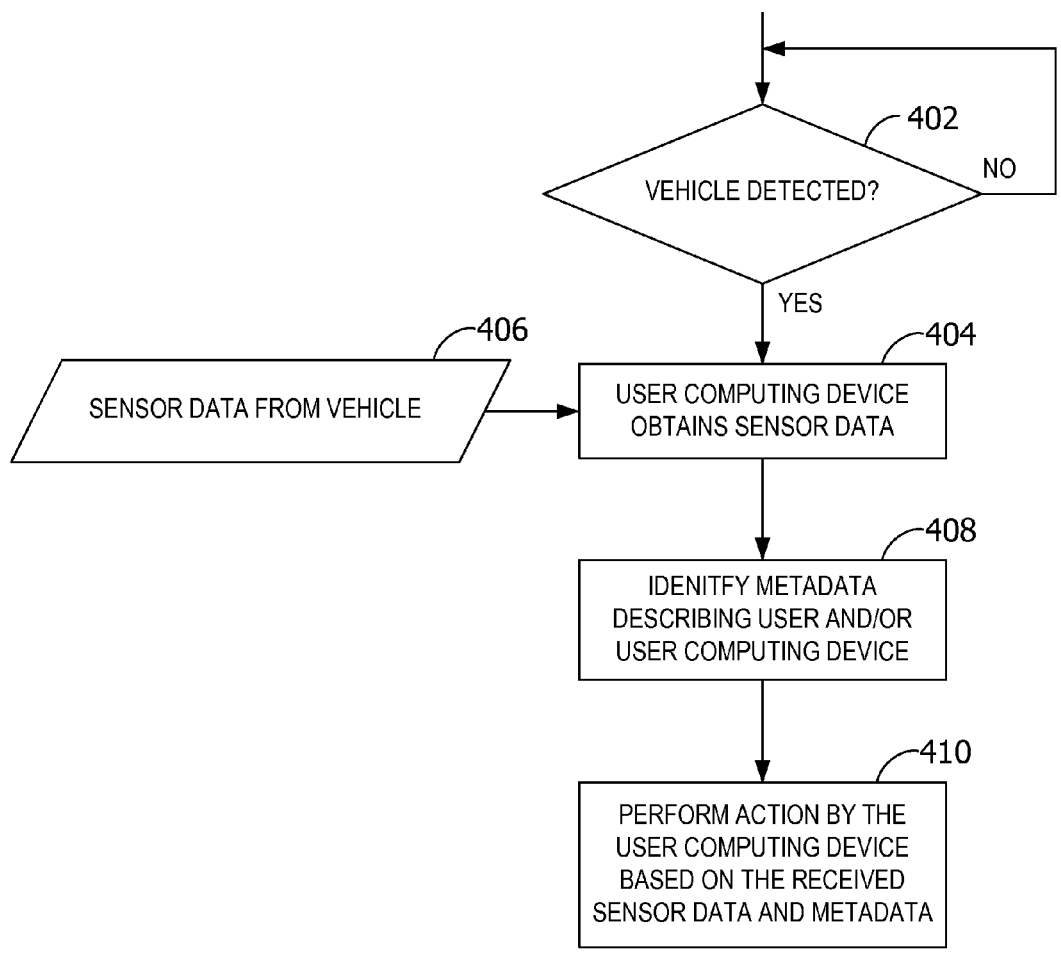
FIG. 4 is an exemplary flow chart illustrating operation of the user computing device to perform actions based on vehicle sensor data and metadata describing the user and/or user computing device.

Referring next to FIG. 4, an exemplary flow chart illustrates operation of the user computing device 102 to perform actions based on vehicle sensor data and metadata 118 describing the user 108 and/or user computing device 102. The user computing device 102 checks for the presence of the vehicle computing device 124 or other component of the vehicle 104. For example, the user computing device 102 detects the vehicle 104 by using a BLUETOOTH brand connection or other short wavelength radio transmission protocol between the user computing device 102 and the vehicle 104.

If the user computing device 102 detects the vehicle 104 proximate to the user computing device 102 at 402, the user computing device 102 receives or obtains sensor data from the vehicle 104 at 404. For example, the user computing device 102 receives data describing one or more of the following: vehicle speed, vehicle location, duration at current location, weather, road conditions, and traffic conditions.

At 408, the user computing device 102 identifies one or more items of metadata 118 describing the user 108 and/or the user computing device 102. The metadata 118 may be stored locally by the user computing device 102, remotely by the cloud-based services 106, or both. Exemplary metadata 118 are described above with reference to FIG. 3.

At 410, the user computing device 102 performs at least one action based on the received sensor data and the metadata 118. For example, the user computing device 102 may identify one or more of the following near the vehicle 104: events, shopping opportunities, and friends of the user 108.

In an exemplary scenario, the user computing device 102 receives sensor data indicating that the vehicle 104 is parked at a particular location and performs a check-in of the user 108 using the particular location on one or more social networking websites. Alternatively or in addition, the user computing device 102 performs the action of obtaining data associated with points of interest to the user 108 near the location. For example, the points of interest are filtered by location and based on the metadata 118 describing the user 108 to produce a set of points of interest that are specific to the user 108 at that location. In another scenario, the user computing device 102 obtains a map of the determined location. The points of interest and the map may be presented to the user 108 on the display 112 of the user computing device 102, or may be sent to the display 122 of the vehicle computing device 124.

In some embodiments, the user computing device 102 detects a proximate user computing device 102 of at least one other user. The user computing device 102 identifies content associated with the other user, and displays the identified content to the user 108. For example, the user computing device 102 may surface one or more text messages, email messages, voicemails, photos, or other content stored on the user computing device 102 that is associated with the detected nearby user.

Additional Examples

At least a portion of the functionality of the various elements in FIG. 1 or FIG. 2 may be performed by other elements in FIG. 1 or FIG. 2, or an entity (e.g., processor, web service, server, application program, computing device, etc.) not shown in FIG. 1 or FIG. 2.

In some embodiments, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 108. In such embodiments, notice is provided to the users 108 of the collection of the data (e.g., via a dialog box or preference setting) and users 108 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media exclude propagated data signals. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for selecting data to be shared between the mobile computing device and the vehicle 104.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having"

are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for augmenting a mobile computing device with data from a vehicle, said system comprising:
   a memory area associated with a mobile computing device, said memory area storing metadata describing a user of the mobile computing device; and
   a processor programmed to:
      detect, by the mobile computing device of the user, a vehicle near the mobile computing device;
      receive, by the mobile computing device, sensor data from the detected vehicle, the sensor data including a location of the detected vehicle determined by the detected vehicle;
      perform at least one action on the mobile computing device, the at least one action comprising customizing the mobile computing device based on preferences of the user specific to the location of the detected vehicle, the customization of the mobile computing device including obtaining information describing events and advertisements specific to the location of the detected vehicle; and
      display the obtained information to the user on the mobile computing device.

2. The system of claim 1, wherein the processor is programmed to receive the sensor data by receiving the location of the detected vehicle and to perform the action by checking-in the user to the location on a social networking website.

3. The system of claim 1, wherein the processor is programmed to receive the sensor data by receiving the location of the detected vehicle and to perform the action by obtaining data associated with points of interest to the user near the location for presentation to the user on the mobile computing device.

4. The system of claim 1, wherein the processor is programmed to receive the sensor data by receiving the location of the detected vehicle and to perform the action by obtaining a map of the location for presentation to the user on the mobile computing device.

5. The system of claim 1, wherein the processor is programmed to receive the sensor data by receiving data describing vehicle speed, vehicle location, duration at current location, weather, road conditions, and traffic conditions.

6. The system of claim 1, wherein the processor is further programmed to:
   detect a mobile computing device of at least one other user near the detected vehicle;
   identify content associated with the other user; and
   display the identified content to the user on the mobile computing device.

7. The system of claim 1, wherein the processor is programmed to perform the action by identifying one or more of the following near the vehicle: events, shopping opportunities, and friends of the user.

8. The system of claim 1, wherein customizing the mobile computing device based on preferences of the user specific to the location of the detected vehicle includes downloading content to the mobile computing device that is relevant for the user at the location of the detected vehicle.

9. A method comprising:
   detecting, by a vehicle computing device within a vehicle, a presence of at least one user computing device of a user in the vehicle, the vehicle computing device being in communication with a cloud-based service;
   obtaining, by the vehicle computing device, metadata describing the user of the user computing device responsive to the detected presence, said metadata being stored by an account of the user in the cloud-based service;
   determining sensor data describing a status of the vehicle, the status of the vehicle including a current location of the vehicle determined by the vehicle computing device; and
   performing at least one action by the vehicle computing device, the at least one action comprising customizing the vehicle computing device based on the obtained metadata of the user and the current location of the vehicle, the customization of the vehicle including downloading content to the user computing device that is relevant for the user at the current location of the vehicle and sharing the downloaded content with the vehicle computing device, the downloaded content comprising information describing events and advertisements specific to the current location of the vehicle, wherein the cloud-based service provides at least the vehicle computing device with entertainment recommendations specific to the current location of the vehicle.

10. The method of claim 9, wherein determining the sensor data comprises determining vehicle parameters, and wherein performing the action comprises providing the sensor data to the cloud-based service and wherein the cloud-based service provides vehicle settings based on the provided sensor data.

11. The method of claim 9, wherein performing the action comprises obtaining data associated with points of interest to the user near the location for presentation to the user on the vehicle computing device.

12. The method of claim 9, wherein performing the action comprises obtaining a map of the location for presentation to the user on the vehicle computing device.

13. The method of claim 9, wherein obtaining the metadata comprises obtaining assisted global positioning system (A-GPS) data from the user computing device, the obtained A-GPS data reducing time-to-fix for location determination by the vehicle computing device.

14. The method of claim 9, wherein performing the action by the vehicle computing device comprises adjusting entertainment content based on customization of the vehicle computing device, from a display in the vehicle.

15. The method of claim 9, wherein detecting the presence of the user computing device comprises one or more of the following: obtaining a presence status of the user from a social networking website, and detecting the presence via a short wavelength radio transmission between the vehicle computing device and the user computing device.

16. The method of claim 9, wherein obtaining the metadata comprises obtaining one or more of the following: user preferences, global positioning system (GPS) coordinates of the user computing device, social networking data of the user, events, advertisements, a user profile, calendar information of the user, and sensor data from one or more sensors associated with the user computing device.

17. One or more computer storage devices embodying computer-executable components, said components comprising:

a presence component that when executed causes at least one processor to detect, by a vehicle computing device within a vehicle, a presence of a plurality of user computing devices in the vehicle, each of the plurality of user computing devices being associated with at least one of a plurality of users occupying the vehicle;

a communications interface component that when executed causes at least one processor to obtain, by the vehicle computing device, metadata describing the plurality of users occupying the vehicle responsive to the presence detected by the presence component, said metadata being stored by the user computing devices, cloud-based accounts of the users, or both;

a preference component that when executed causes at least one processor to combine the metadata for the plurality of users occupying the vehicle obtained by the communications interface component;

a sensor component that when executed causes at least one processor to determine sensor data describing a status of the vehicle, the status of the vehicle including a current location of the vehicle; and a customization component that when executed causes at least one processor to perform at least one action by the vehicle computing device based on the combined metadata of the plurality of users occupying the vehicle and the determined sensor data of the vehicle, the at least one action comprising downloading content to the vehicle computing device, the downloaded content comprising information describing events and advertisements based on the combined metadata of the plurality of users occupying the vehicle.

18. The computer storage devices of claim 17, wherein the preference component combines the metadata for the plurality of users by combining preferences of the plurality of users to produce content recommendations for display to the plurality of users by the vehicle computing device.

19. The computer storage devices of claim 17, wherein the presence component further detects a seating location of each of the plurality of users in the vehicle, and wherein the customization component provides content to the plurality of users based on the detected seating locations and group recommendations from the combined metadata.

20. The computer storage devices of claim 17, wherein the communications interface component further captures user activity in the vehicle for submission by the vehicle computing device to content providers.

* * * * *